United States Patent Office 2,915,491
Patented Dec. 1, 1959

2,915,491

PHENOLIC RESINS AND THEIR USE IN MOULDING PROCESSES

Eric Smith, Springfield, Mass., assignor to Monsanto Chemicals Limited, London, England, a British company No Drawing. Application April 30, 1956
Serial No. 581,275

Claims priority, application Great Britain June 6, 1955

3 Claims. (Cl. 260—38)

This invention relates to phenolic resins suitable for use in making moulds and cores for casting metals, to processes for preparing them, to compositions containing them, and their use in the making of shell-moulds.

In recent years the shell-moulding process for the manufacture of metal casting moulds has become widely adopted. In this process moulds are prepared using a finely-divided refractory material (normally sand) which has been mixed or treated with a thermosetting resin. A hot pattern is covered with the treated sand (or other material) and the sand is allowed to remain in contact with the pattern so that curing of the thermosetting resin is effected. The cured resin binds the sand particles and a hard layer of partially cured resin-sand composition is formed on the surface of the pattern. The thickness of this layer corresponds to the depth of cure of the resin which of course depends on the temperature of the pattern and the time of contact. As soon as a sufficient thickness of cured composition is removed, leaving the pattern covered with a shell of cured resin-sand composition, which is usually further heated in an oven to complete the curing process so that the shell is as strong as possible. The shell is then stripped from the pattern and employed as a mould for metal casting.

The success achieved using the shell-mould depends to a great extent on the properties of the thermosetting resin which is employed as binder for the sand. In order to give satisfactory results it is necessary for the resin to be solid in the uncured state, so that a dry free-flowing resin-sand composition can be prepared. On the other hand it must at the commencement of the curing process show good flow properties, permitting uniform resin distribution among the sand particles, providing even conduction of heat from the hot pattern so that a shell of even thickness is formed, and giving a smooth surface finish to the mould. The temperature and time of cure should be conveniently low so that the shell-mould can be made quickly. The cured resin-sand composition needs to have as high a flexural strength as possible so that the shell-mould is mechanically strong, and this strength should be retained as much as possible when hot metal is poured into the mould, so that the mould retains its shape under these severe conditions.

The resins most used as binders in making shell-moulds are phenol-formaldehyde resins of the "novolak" type. These resins are prepared by the condensation of phenol and formaldehyde using an acid catalyst. Alkaline-condensed phenol-formaldehyde resins have hitherto been regarded as unsuitable for the shell-moulding process because in general they contain a large proportion of water, and steam-blisters are produced when a sand-resin composition made from such a resin is brought into contact with a hot pattern. The dried resins make very poor binding agents for sand probably because of their poor flow characteristics. Moreover most alkaline-condensed resins contain such a high proportion of alkali metal (derived from the alkali metal hydroxide catalyst used) that shell moulds prepared using them would in any case be unsatisfactory because of reaction of hot metal at the surface of the mould to form slag. Water and alkali metal content can be removed by acidification of the resins before use, but it has been found that the resulting resins are still of little value for shell-moulding because of their poor flow characteristics. It would be of advantage if these difficulties could be avoided and alkaline-condensed resins could be employed, for their manufacture is in some respects more easy than manufacture of the acid-condensed resins.

An alkaline-condensed resin suitable for use in the shell-moulding process has now been found. It has been discovered that certain phenol-formaldehyde resins prepared by an alkaline condensation using ammonia as the condensation catalyst give very satisfactory results in shell-moulding. Ammonia has long been known as a catalyst for the condensation of phenol and formaldehyde and various resins have been prepared in the past by condensations using it. It has been found that most ammonia-condensed resins are unsuitable for shell-moulding, but that if the molecular ratio of phenol to formaldehyde used in the condensation is from 1:1.3 to 1:1.5, resins can be obtained which contain negligible amounts of water and have the other necessary characteristics of a shell-moulding resin. If the proportions of reactants lie outside this narrow range, the product is unsatisfactory. Thus resins having a lower formaldehyde content do not give uncured resin-sand compositions having the requisite free-flowing properties. On the other hand resins having a higher formaldehyde content do not possess the necessary flow properties during the curing process.

According to the invention, therefore, a phenolic resin suitable for use as a binder in the shell-moulding process is prepared by condensing phenol and formaldehyde together in the proportion of 1 mol. phenol to from 1.3 to 1.5 mols. formaldehyde, using ammonia as condensation catalyst.

The invention also includes compositions suitable for direct use in the shell-moulding process comprising one of these ammonia-condensed resins and a finely-divided refractory material. Also to be regarded as within the invention are processes for making shell-moulds using such compositions.

Preferably from 1.35 to 1.4 mols. of formaldehyde to 1 mol. phenol is used in the condensation. The resins are in practice prepared using from 0.05 to 0.35 mol. of ammonia as condensation catalyst. The formaldehyde can be used in the form of para-formaldehyde or hexamethylenetetramine if desired, but conveniently an aqueous solution of formaldehyde is employed. Preferably in order to assist commencement of the condensation, a small amount of sodium hydroxide, for instance from 0.01 to 0.02 mol. per mol. of phenol, is also added. The resins are conveniently prepared by heating the ingredients together in aqueous medium until exothermic reaction commences, then cooling if necessary to keep the reaction under control, and finally when the exothermic reaction has subsided, heating the reaction mixture until on cooling the precipitated liquid resin solidifies. The solidified resin can be crushed to a suitable particle size.

In using the resin to prepare a composition ready for direct use in the shell-moulding process, the resin in a form of sufficiently fine particle size can be mixed directly with the sand or other finely-divided refractory material, for instance, sillimanite or fireclay. Alternatively if the resin is soluble in a suitable solvent, a solution of the resin can be used to treat the sand and the solvent can be removed subsequently by evaporation, leaving the resin evenly coated on the particles of sand.

Methylated spirits is a solvent which is generally suitable. When this method of preparing the resin-sand compositions is used, some aggregation may occur and it is desirable to break down the aggregate to a suitably fine particle size. The solubility of the resins depends to some extent on the proportion of ammonia used during the condensation and if a soluble resin is desired in order that it can be applied from solution the proportion of ammonia employed during the condensation should be in the lower part of the range of 0.05 to 0.35 mol. ammonia to each mol. of phenol. The particle size of the sand (or other refractory material) will be less than that corresponding to 30 mesh to the inch in practice, and various particle sizes down to 200 mesh or even lower are suitable. The proportion of resin to sand used should not be so low that there is insufficient to form a bond for the sand; neither should it be so high that a large amount of resin is present on the face of a shell-mould made with the mixture so that an undue amount of charring occurs when molten metal is poured into the shell-mould. Usually the proportion of resin will be from 5 to 15% by weight of the sand or other refractory material, and about 7 or 8% is generally convenient.

The resin-sand compositions of the invention are particularly suitable for use in the making of shell-moulds, but they can also be used for preparing moulds of other kinds, and in particular for making mould cores.

The temperature required for the curing of the resin in such resin-sand compositions depends to some extent on the exact constitution of the resin, and in practice it will also depend on the proportion of resin in the composition and the time in which it is desired to effect the cure. Where the resin-sand composition is used to make a shell-mould, the temperature employed will also depend on the thickness of the shell desired. Temperatures within the range 150° to 350° C. are generally suitable for the curing process, so that it is convenient to heat a metal pattern to say 250° C., and apply the resin-sand composition to it for a few seconds before removing the excess composition. The final curing can be carried out in an oven maintained at for instance 325° C. for a few minutes. The most suitable conditions of time and temperature in any given instance can of course be determined by simple testing.

The invention is illustrated by the following examples:

*Example I*

This describes the preparation of an ammonia-condensed phenol-formaldehyde resin, the phenol, formaldehyde and ammonia used being in the respective molecular proportions 1:1.38:0.07. Phenol (323 g. containing 8% of water) and 37% aqueous solution of formaldehyde (332 g.) were mixed together in a glass flask. Aqueous ammonia (27.5 g. of a 27% solution by weight) and sodium hydroxide (2 g.) were added and the reaction mixture was heated on a steam bath until exothermic reaction commenced. The reactants were then cooled as required to keep the reaction under control, and as the reaction proceeded, the reactant separated into two layers. When exothermic reaction had ceased, external heat was again applied and the mixture was refluxed for 40 minutes with efficient stirring. The upper aqueous layer was then decanted and the liquid resin washed with hot water. The liquid resin was poured off and allowed to cool and solidify. The solid resin was crushed into small lumps passing ¼" mesh which were placed in the open air for 24 hours to dry at room temperature.

The ammonia-condensed resin thus obtained was a brittle bright yellow solid, M.P. 85–92° C. It was soluble in organic solvents such as methylated spirits and acetone and could be ground by pestle and mortar sufficiently to pass through a British Standard sieve of 200 mesh. The resin was tested by placing a pill of it upon an aluminum plate held at an angle of 30° to the horizontal and maintained in an oven at 90° C. After it had been left for 1 hour, a flow of the resin down the plate of 1 cm. was observed. This indicated that the resin had very satisfactory high temperature flow characteristics.

*Example II*

An ammonia-condensed resin having a phenol:formaldehyde:ammonia ratio of 1:1.38:0.3 was prepared in a manner similar to that described in Example I, but using a larger quantity of ammonia (119.4 g. of 27% aqueous solution). The bright yellow resin obtained was a brittle solid at room temperature and was insoluble in methylated spirits, through some swelling of the resin was visible when the solvent was added.

*Example III*

A resin-sand composition was prepared by grinding the resin of Example I to pass a B.S. sieve of 200 mesh and mixing 7 parts by weight of it with 100 parts of a shell-moulding sand known as Redhill Grade H moulding sand: this sand was a fine particle size sand of silica content 98.7% and having a sub-angular grain shape. The particle size of the sand was such that the whole of the sand passed a B.S. sieve of mesh 60; 30% was retained by a sieve of mesh 150, and 18% of it passed a sieve of mesh 200.

On testing, this resin-sand composition was found to give a rigid material on baking for 25–30 seconds at 260–280° C.

*Example IV*

A resin-sand composition was prepared by dissolving the resin of Example I in methylated spirits to give a 55% solution by weight, mixing 13 parts by weight of this solution with 100 parts of the shell-moulding sand referred to in Example III, and evaporating the solvent by heating at 65° C. for 2½ hours. The product showed slight aggregation and was lightly ground with pestle and mortar until it passed through a sieve of 100 mesh.

*Example V*

A resin-sand composition was prepared as described in Example III, but using the resin of Example II. The composition when tested was found to give a rigid material on baking for 5 minutes at 300° C.

*Example VI*

This describes the use of the resin-sand composition of Example IV in the preparation of a shell-mould. A pattern plate of size 9" x 9" was heated to 180° C., placed over a "dump box" containing the composition and the box and plate were inverted so that the composition fell on to the pattern surface. After 10 seconds the box and plate were again inverted so that uncured composition fell back into the box, leaving a layer of partially cured composition attached to the plate. The pattern plate with its adherent shell was removed and placed for 3 minutes in an oven maintained at 310° C.

The shell was then removed from the pattern: it was about ⅜" thick, had a good surface finish, perfectly uniform resin distribution and good flexural strength.

*Example VII*

In this example a shell-mould was prepared using the resin-sand composition of Example V. The procedure of Example VI was followed, the initial temperature of the pattern plate being 250° C., the time of contact of the plate with the resin-sand composition in the dump box being 10 seconds, the oven temperature 325° C. and the time of baking in the oven 2 mins. 20 secs. During the baking operation a certain amount of ammonia was driven off.

The surface finish of the shell produced was extremely good, the resin distribution was fairly good and the flexural strength excellent.

What I claim is:

1. A composition for use in the shell-moulding process consisting of a dry mixture of a finely divided refractory material taken from the group consisting of sand, sillimanite and fire clay and from 5 to 15% by weight of a phenolic resin prepared by condensing one mol of phenol with from 1.3 to 1.5 mols of formaldehyde in an aqueous medium in the presence of 0.05–0.35 mol of ammonia under controlled exothermal conditions and then further heating the reaction mixture until on cooling the precipitated liquid resin solidifies.

2. A composition for use in the shell-moulding process consisting of a dry mixture of a finely divided refractory material taken from the group consisting of sand, sillimanite and fire clay and from 5 to 15% by weight of a phenolic resin prepared by condensing one mol of phenol with from 1.35 to 1.4 mols of formaldehyde in an aqueous medium in the presence of 0.05–0.35 mol of ammonia under controlled exothermal conditions and then further heating the reaction mixture until on cooling the precipitated liquid resin solidifies.

3. A composition for use in the shell-moulding process consisting of a dry mixture of a finely divided refractory material taken from the group consisting of sand, sillimanite and fire clay and from 5 to 15% by weight of a phenolic resin prepared by condensing one mol of phenol with from 1.3 to 1.5 mols of formaldehyde in an aqueous medium in the presence of 0.05–0.35 mol of ammonia and 0.01 to 0.02 mol of sodium hydroxide under controlled exothermal conditions and then further heating the reaction mixture until on cooling the precipitated liquid resin solidifies.

References Cited in the file of this patent

UNITED STATES PATENTS

| | | |
|---|---|---|
| 1,126,926 | Weichmann | Feb. 2, 1915 |
| 2,452,420 | Allan | Oct. 26, 1948 |
| 2,521,614 | Valyi | Sept. 5, 1950 |
| 2,623,865 | Dietz | Dec. 30, 1952 |
| 2,683,296 | Drumm et al. | July 13, 1954 |
| 2,807,556 | Stark | Sept. 24, 1957 |

FOREIGN PATENTS

| | | |
|---|---|---|
| 735,564 | Great Britain | Aug. 24, 1955 |

OTHER REFERENCES

Jablonower: "Study of Velocity of Reaction Between Phenol and Formaldehyde," J.A.C.S., vol. 35, (1913), pages 811 and 812. (Copy in Sci. Lib.)

Robitschek: "Phenolic Resins," Iliffe and Sons, Ltd., London (1950), page 79. (Copy in Div. 60.)